July 30, 1963  C. D. P. SMALLPEICE  3,099,546
FILTERS FOR FLUIDS

Filed Aug. 26, 1960  2 Sheets-Sheet 2

Inventor
COSBY DONALD PHILIPPS SMALLPEICE

By Mawhinney &
Mawhinney
Attorneys

United States Patent Office 3,099,546
Patented July 30, 1963

3,099,546
FILTERS FOR FLUIDS
Cosby Donald Philipps Smallpeice, Swanwick Shore, near Southampton, England, assignor of one-half to Nuquip Limited, Surrey, England
Filed Aug. 26, 1960, Ser. No. 52,294
Claims priority, application Great Britain Oct. 12, 1959
5 Claims. (Cl. 55—274)

The invention relates to a filter, for a fluid, of the kind including an exchangeable filter element, and the object of the invention is to provide for an indication to be given when the filter element requires cleaning or replacing.

According to the invention the filter has the exchangeable filter element arranged such that as its permeability is reduced, by an accretion of filtered residue, the consequent increase in its flow resistance will cause at least a part of it to be moved, against a bias, by the pressure of the fluid being filtered, the extent of the said movement being such as to give an indication of the condition of permeability of the element. The aforesaid bias can be inherent in the filter element itself or it can be applied separately, for example, by a suitable spring.

Where the fluid to be filtered is transparent, the element may be arranged within a container of which at least a portion is transparent so as to permit the position of a datum on the element to be observed from outside the container.

Alternatively, or additionally the element may be arranged to actuate means for giving an indication when the element should be exchanged or cleaned. Thus, it can be arranged for the movement of the element to operate an electrical contact to complete a circuit to a visual or audible instrument included in the circuit, or, where the fluid is a gas, for the element to actuate a valve for by-passing the gas through a whistle or other audible indicator.

The invention is applicable to filter elements of a variety of shapes; but is particularly suitable in the case where a filter element is cylindrical, or is for example, in the form of a bellows.

Figure 1:
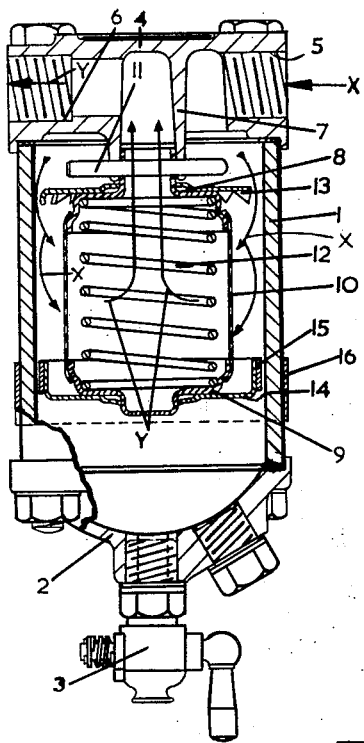
Figure 3:
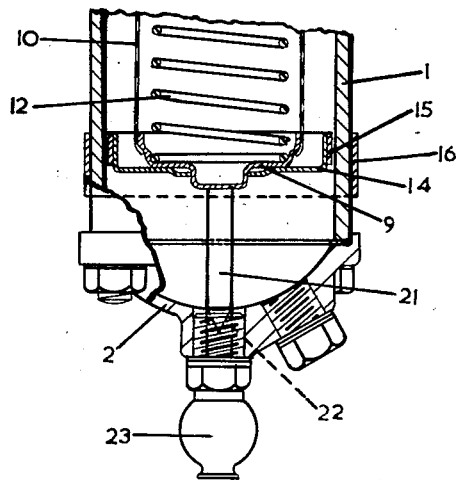
Figure 2:
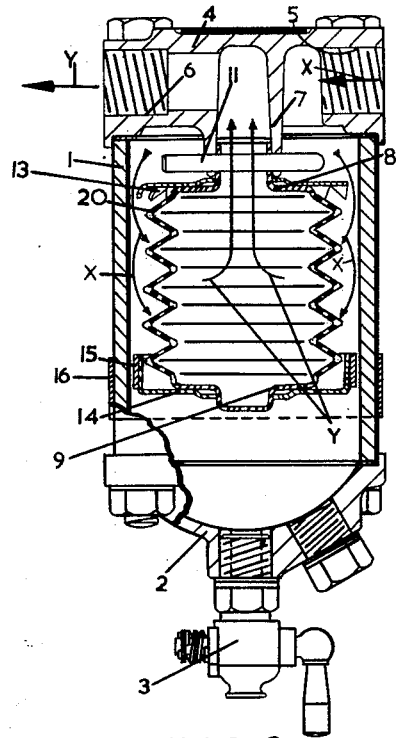
Figure 4:
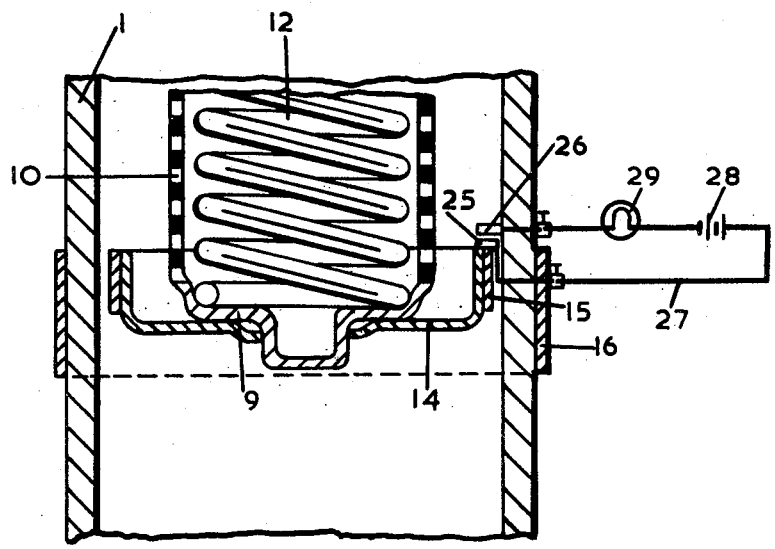

By way of example, four filters according to the invention will now be described with reference to the accompanying drawings, in which:

FIGURE 1 is an axial sectional view of the first filter;
FIGURE 2 is similar to FIGURE 1 but shows the second filter having a modified filter element;
FIGURE 3 is similar to the lower part of FIGURE 1 but shows part of the third filter, and
FIGURE 4 is similar to part of FIGURE 1 but shows part of the fourth filter.

Referring to FIGURE 1, the filter comprises a tubular transparent container 1, which is closed at its lower end by an end member 2 containing a drain cock 3. At the top of the container 1, there is a block 4 including an inlet pipe connection 5, communicating with the interior of the container, and an outlet pipe connection 6, communicating with a spigot 7, in which the upper end of the filter element is fitted. The filter element comprises a pair of rigid end plates 8, 9, and an extendible cylindrical fine mesh gauze 10 of metal or plastic mounted between the end plates. The upper end plate 8 has a central tubular portion, which is fitted into the spigot 7 and is held therein by a removable pin 11. Inside the cylindrical gauze, there is a helical compression spring 12 mounted between the two end plates 8, 9 and arranged to urge them apart, thereby extending the gauze 10 and assisting in keeping it in cylindrical shape. The upper end plate 8 carries a disc 13, having a downwardly-extending, serrated flange, to assist in circulation within the container 1 of fluid admitted through the pipe connection 5. The lower end plate 9 carries a disc 14 having an upwardly-extending flange 15 which locates the filter element laterally in the container and which also forms a movable indicator, co-operating with a fixed indicating ring 16 mounted around the container 1.

In operation, the filter is mounted upright as shown in FIGURE 1 and air, containing suspended particles to be separated, is admitted through the inlet pipe connection 5 into the interior of the container 1 around the filter element. The air flows inwardly into the element through the gauze 10 in the direction of arrows X and leaves by the outlet pipe connection 6 in the direction of arrows Y. Dust or other particles filtered from the air adheres to the gauze 10 thus reducing its permeability. This gives rise to a pressure differential between the outside and the inside of the filter element, which causes the gauze 10 to be compressed axially, against the effort of the contained spring 12. The resultant upward movement of the closed end of the element can be observed through the transparent container 1 and gives an indication of its residual permeability.

The upper edge of the flange 15 is usually below the top of the indicating ring 16 and when the upper edge of the flange 15, or a datum line on the flange has risen above the top of the ring 16, the filter element should be cleaned or exchanged.

Obviously, if the filter element were to be in the form of a bellows, or chamber having a circumferentially-corrugated cylindrical wall, there would be no need to provide it with an internal compression spring 12, the bias being applied by the natural resilience of the material forming the bellows or the chamber. FIGURE 2 shows a bellows 20 of porous material, in the position in the filter, instead of the filter element shown in FIGURE 1. Other parts of the filter are similar and are indicated by the same reference numerals as are like parts in FIGURE 1.

Instead of the whole element being formed as a bellows, one portion only of the element may be rigid and porous, another portion being resilient and responsive to the difference between the pressures inside and outside the said rigid portion. For example, the resilient portion may be a bellows, which is attached to one end of the rigid portion and communicates internally with the interior of the said rigid portion, the movement of the end of the bellows remote from the rigid portion giving an indication when the element requires cleaning or replacing and the natural resilience of the material forming the bellows providing the bias. The resilient portion may be another pressure responsive and resilient device; instead of a bellows, and may also be porous or permeable.

Instead of relying on the transparency of the container 1 to permit upward movement of the closed end of the filter element to be observed from the outside, the closed lower end plate 9 of the element can alternatively or additionally be provided with a movable member of a valve which coacts with a seat in the bottom 2 of the container. FIGURE 3 shows such an arrangement in which a movable plunger 21 co-operates with a seat 22, which leads to a whistle 23 such that, when the movable plunger 21 unseals the seat 22, some of the air to be filtered will pass through the whistle 23 and give an audible warning. The whistle 23 can be provided in place of or additionally to the drain cock 3. Where applicable the same reference numerals have been used as in FIGURE 1. Instead of the movable end plate 9 of the filter element carrying a plunger 21, it may carry a contact 25 which will engage another contact 26, mounted on the inner surface of the container 1, and will complete an electrical circuit 27, including a battery 28 and a visual or audible warning instrument (e.g., a lamp 29), which will indicate when the filter element should be cleaned or replaced (see FIGURE 4). Alternatively, the plunger 21 may open a valve through which fluid can pass to give a visual indication that fluid is passing through the valve and hence that the filter element should be exchanged or cleaned. The valve may communicate with a pressure gauge responsive to the pressure of fluid flowing through the valve, thereby to indicate when the element should be exchanged or cleaned.

Although the filters described hereinafter have been described as being used for air, they may be used for cleaning other gases and, except in the case of the filter incorporating a whistle, be used for cleaning liquids.

Where the filter element is constructed from a plastic, e.g., nylon, gauze, it has the advantage that it will undergo intermittent jumping initially due to partial clogging of the pores and this movement will shake off much of the dirt collecting on it and hence the element is difficult to clog, except with very fine or sticky particles, and hence has a long life.

What I claim as my invention and desire to secure by Letters Patent of the United States is:

1. A filter, for cleaning a gas, comprising a container having an inlet and an outlet for the gas to be cleaned and an exchangeable filter positioned within said container, said filter element having a permeable, axially extendible and contractible, tubular wall through the pores of which said gas is passed in its path from said inlet to said outlet, said wall being axially contractible against a bias as a result of a difference in gas pressure upstream and downstream of said wall due to reduction of its permeability by an accretion of filtered residue to give an indication of the reduction of the permeability of said wall, the filter also comprising a valve through which said gas can pass from said container, said valve being opened on said contraction of said wall, and a flow-responsive device capable of giving an audible signal communicating with said valve and operable by said gas flowing therethrough.

2. A filter comprising a container having an inlet and an outlet for the fluid to be cleaned and an exchangeable filter element positioned within said container, said filter element having a permeable, axially extendible and contractible, tubular wall through the pores of which said fluid is passed in its path from said inlet to said outlet, said wall being axially contractible against a bias as a result of a difference in fluid pressure upstream and downstream of said wall due to reduction of its permeability by an accretion of filtered residue to give an indication of the reduction of the permeability of said wall, said wall carrying a datum and at least a portion of said container being transparent so as to permit the position of said datum to be observed from outside the container, the filter also comprising warning means, including a warning device, capable of giving a warning when the element should be removed from the container, a movable member carried by said wall and a fixed member carried by said container, said movable member being coactable with said fixed member when said wall is axially contracted to effect operation of said warning device.

3. A filter comprising a container having at least one transparent wall and having an inlet and an outlet for the fluid to be cleaned, an exchangeable filter element positioned within said container, said filter element having a permeable wall through which said fluid is passed in its path from said inlet to said outlet, said wall being axially contractible against a bias as a result of a difference in fluid pressure upstream and downstream of said wall due to reduction of its permeability by an accretion of filtered residue to give an indication of the permeability of said wall of the filter element, a datum carried by said wall of the filter element exteriorly thereof, and an opaque member encircling said container so as to mask a portion of the transparent wall of the container and to mask said datum as long as the wall of the filter element is uncontracted and to permit the datum to be observed through the transparent wall when the permeability of the element has been reduced so that the wall of the element is contracted and the datum is moved by the contraction of the wall from behind the opaque member and is visible to an observer from outside the container.

4. A filter comprising a container having an inlet and an outlet for the fluid to be cleaned and an exchangeable filter element positioned within said container, said filter element having a permeable, axially extendible and contractible, tubular wall through the pores of which said fluid is passed in its path from said inlet to said outlet, said wall being axially contractible against a bias as a result of a difference in fluid pressure upstream and downstream of said wall due to reduction of its permeability by an accretion of filtered residue to give an indication of the reduction of the permeability of said wall, the filter also comprising warning means including a warning device, capable of giving a warning when the element should be removed from the container, a movable member carried by said wall and a fixed member carried by said container, said movable member being coactable with said fixed member when said wall is axially contracted to effect operation of said warning device, said warning means comprising an electrical circuit, said warning device being an electrical warning instrument included in said circuit and said movable and fixed members being a pair of contacts, which, when closed, complete said circuit.

5. A filter comprising a container having a transparent portion and having an inlet and an outlet for the fluid to be cleaned and an exchangeable filter element positioned within said container, said filter element having a permeable, axially extendible and contractible, tubular wall through the pores of which said fluid is passed in its path from said inlet to said outlet, said wall being axially contractible against a bias as a result of a difference in fluid pressure upstream and downstream of said wall due to reduction of its permeability by an accretion of filtered residue, to give an indication of the reduction of the permeability of said wall, the filter also comprising a fluid operable warning device and a valve through which fluid can pass from said container to said device when said wall is axially constructed, said valve comprising a fixed seating carried by said container and a movable valve member carried by said wall.

References Cited in the file of this patent

UNITED STATES PATENTS

| 951,624 | Thurman | Mar. 8, 1910 |
| 1,109,639 | Sutton | Sept. 1, 1914 |
| 1,127,242 | Hay | Feb. 2, 1915 |
| 1,770,094 | Wickersham | July 8, 1930 |
| 1,991,859 | Lofgren | Feb. 19, 1935 |
| 2,022,250 | Lofgren | Nov. 26, 1935 |
| 2,077,572 | Lofgren | Apr. 20, 1937 |
| 2,300,705 | Schott | Nov. 3, 1942 |
| 2,320,368 | Leathers | June 1, 1943 |
| 2,700,362 | Calling | Jan. 25, 1955 |

FOREIGN PATENTS

| 42,636 | Netherlands | Feb. 15, 1938 |